(12) United States Patent　　　　　(10) Patent No.: US 12,639,459 B2
Bishop et al.　　　　　　　　　　　(45) Date of Patent: May 26, 2026

(54) LIMITING CLOUD PERMISSIONS IN DEPLOYMENT PIPELINES

(71) Applicant: Intuit Inc., Mountain View, CA (US)

(72) Inventors: Thomas C. Bishop, San Diego, CA (US); Brett Weaver, San Diego, CA (US); Jerome M. Kuptz, Mountain View, CA (US); Paul Clata, Carlsbad, CA (US); Edward Lee, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 630 days.

(21) Appl. No.: 17/654,503

(22) Filed: Mar. 11, 2022

(65) Prior Publication Data

US 2023/0306126 A1　　Sep. 28, 2023

(51) Int. Cl.
*G06F 21/62* 　　(2013.01)
*G06F 9/50* 　　(2006.01)
*G06F 21/57* 　　(2013.01)

(52) U.S. Cl.
CPC ........ *G06F 21/6218* (2013.01); *G06F 9/5077* (2013.01); *G06F 21/57* (2013.01); *G06F 2221/2141* (2013.01)

(58) Field of Classification Search
CPC ...... G06F 8/60; G06F 21/6218; G06F 9/5077; G06F 2221/2141; G06F 21/31; G06F 21/57; H04L 63/08; H04L 63/10; H04L 67/10
See application file for complete search history.

(56) References Cited

U.S. PATENT DOCUMENTS

| | | | | |
|---|---|---|---|---|
| 9,432,350 | B2 * | 8/2016 | Anderson | G06F 9/455 |
| 9,680,839 | B2 * | 6/2017 | Faitelson | G06F 21/41 |
| 9,825,881 | B2 * | 11/2017 | Johnston | G06F 8/65 |
| 10,606,660 | B1 * | 3/2020 | Hartley | G06F 9/5083 |
| 10,708,053 | B2 * | 7/2020 | Jain | H04L 9/3213 |
| 11,252,157 | B1 * | 2/2022 | Khanna | G06F 9/5005 |
| 2016/0094483 | A1 * | 3/2016 | Johnston | G06F 8/65 |
| | | | | 709/226 |
| 2016/0191536 | A1 * | 6/2016 | Kling | G06Q 10/10 |
| | | | | 726/4 |
| 2016/0337356 | A1 * | 11/2016 | Simon | H04L 63/10 |
| 2021/0352074 | A1 * | 11/2021 | Viswanath | H04L 63/101 |

OTHER PUBLICATIONS

Terraform Enterprise, Terraform by HashiCorp, printed from the Internet on Nov. 19, 2021 at URL: https://www.terraform.io/enterprise.
GitHub, GitHub Actions, Automate Your Workflow from Idea to Production, printed from the Internet on Nov. 19, 2021 at URL: https://github.com/features/actions.
Jenkins, Blue Ocean, Blue Ocean for Jenkins Pipelines, printed from the Internet on Mar. 11, 2022 at URL: https://www.jenkins.io/projects/blueocean/.

* cited by examiner

*Primary Examiner* — Lizbeth Torres-Diaz
(74) *Attorney, Agent, or Firm* — Paradice and Li LLP

(57) ABSTRACT

Systems and methods for selectively updating permissions associated with a cloud resource deployment are disclosed. An example method includes receiving a first request to deploy first target cloud resources based on a first specified state defined in a configuration repository, selectively updating deployment permissions associated with the first specified state and deploying the first target cloud resources based at least in part on the first specified state and the updated deployment permissions.

18 Claims, 4 Drawing Sheets

400

402
Receive a first request to deploy first target cloud resources based on a first specified state defined in a configuration repository.

404
Selectively update a first set of permissions associated with the first specified state.

406
Deploy the first target cloud resources based at least in part on the first specified state and the updated permissions.

400

402

Receive a first request to deploy first target cloud resources based on a first specified state defined in a configuration repository.

404

Selectively update a first set of permissions associated with the first specified state.

406

Deploy the first target cloud resources based at least in part on the first specified state and the updated permissions.

LIMITING CLOUD PERMISSIONS IN DEPLOYMENT PIPELINES

TECHNICAL FIELD

This disclosure relates generally to cloud computing, and more particularly to managing permissions relating to cloud computing deployments.

DESCRIPTION OF RELATED ART

Companies and individuals increasingly make use of cloud computing in order to deliver computing resources over networks such as the Internet. Deploying computing resources via the cloud may offer cost savings, in addition to improved scalability, performance, and economies of scale. Cloud computing deployments may provide services and solutions which end users or customers may access on demand, such as software as a service (SaaS), platform as a service (PaaS), infrastructure as a service (IaaS) and so on. Cloud computing deployments may use one or more of a number of cloud computing providers. In addition, cloud computing deployments may use different configuration frameworks—development tools, middleware, database services, and other tools which may ease the creation, deployment, and management of cloud computing resources.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for selectively updating permissions associated with a cloud resource deployment. An example method includes receiving a first request to deploy first target cloud resources based on a first specified state defined in a configuration repository, selectively updating deployment permissions associated with the first specified state and deploying the first target cloud resources based at least in part on the first specified state and the updated deployment permissions.

In some aspects, the first target cloud resources are deployed, and the deployment permissions are selectively updated within a common workflow. In some aspects, the common workflow may be associated with a version control system, such as a Git version control system, and the configuration repository may be a Git repository. In some aspects, the common workflow may include a management context for establishing and updating permissions associated with the first target cloud resources, wherein access to the management context is removed after deploying the first target cloud resources.

In some aspects, the deployment permissions are defined within the configuration repository. In some aspects, selectively updating the deployment permissions includes comparing the deployment permissions to a set of allowed permissions. In some aspects, deployment of the first target cloud resources is halted in response to the deployment permissions including permissions not allowed by the set of allowed permissions. In some aspects, selectively updating the deployment permissions includes removing permissions from the deployment permissions which are not allowed by the set of allowed permissions.

In some aspects, selectively updating the deployment permissions includes comparing the deployment permissions with first existing permissions of a cloud account associated with the first target cloud resources. In some aspects, the method further includes, in response to identifying missing permissions of the first existing permissions not found within the deployment permissions, updating the deployment permissions to include the missing permissions.

In some aspects, selectively updating the deployment permissions also includes identifying required permissions for deploying the first cloud resources based on the first specified state. In some aspects, the method further includes comparing the required permissions to the deployment permissions and updating the deployment permissions to include required permissions not found in the deployment permissions.

Another innovative aspect of the subject matter described in this disclosure can be implemented in a system for selectively updating permissions associated with a cloud resource deployment. An example system includes one or more processors, and a memory storing instructions for execution by the one or more processors. Execution of the instructions causes the system to perform operations including receiving a first request to deploy first target cloud resources based on a first specified state defined in a configuration repository, selectively updating deployment permissions associated with the first specified state and deploying the first target cloud resources based at least in part on the first specified state and the updated deployment permissions.

In some aspects, the first target cloud resources are deployed, and the deployment permissions are selectively updated within a common workflow. In some aspects, the common workflow may be associated with a version control system, such as a Git version control system, and the configuration repository may be a Git repository. In some aspects, the common workflow may include a management context for establishing and updating permissions associated with the first target cloud resources, wherein access to the management context is removed after deploying the first target cloud resources.

In some aspects, the deployment permissions are defined within the configuration repository. In some aspects, selectively updating the deployment permissions includes comparing the deployment permissions to a set of allowed permissions. In some aspects, deployment of the first target cloud resources is halted in response to the deployment permissions including permissions not allowed by the set of allowed permissions. In some aspects, selectively updating the deployment permissions includes removing permissions from the deployment permissions which are not allowed by the set of allowed permissions.

In some aspects, selectively updating the deployment permissions includes comparing the deployment permissions with first existing permissions of a cloud account associated with the first target cloud resources. In some aspects, execution of the instructions causes the system to perform operations further including, in response to identifying missing permissions of the first existing permissions not found within the deployment permissions, updating the deployment permissions to include the missing permissions.

In some aspects, selectively updating the deployment permissions also includes identifying required permissions for deploying the first cloud resources based on the first specified state. In some aspects, execution of the instructions causes the system to perform operations further including comparing the required permissions to the deployment permissions and updating the deployment permissions to include required permissions not found in the deployment permissions.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
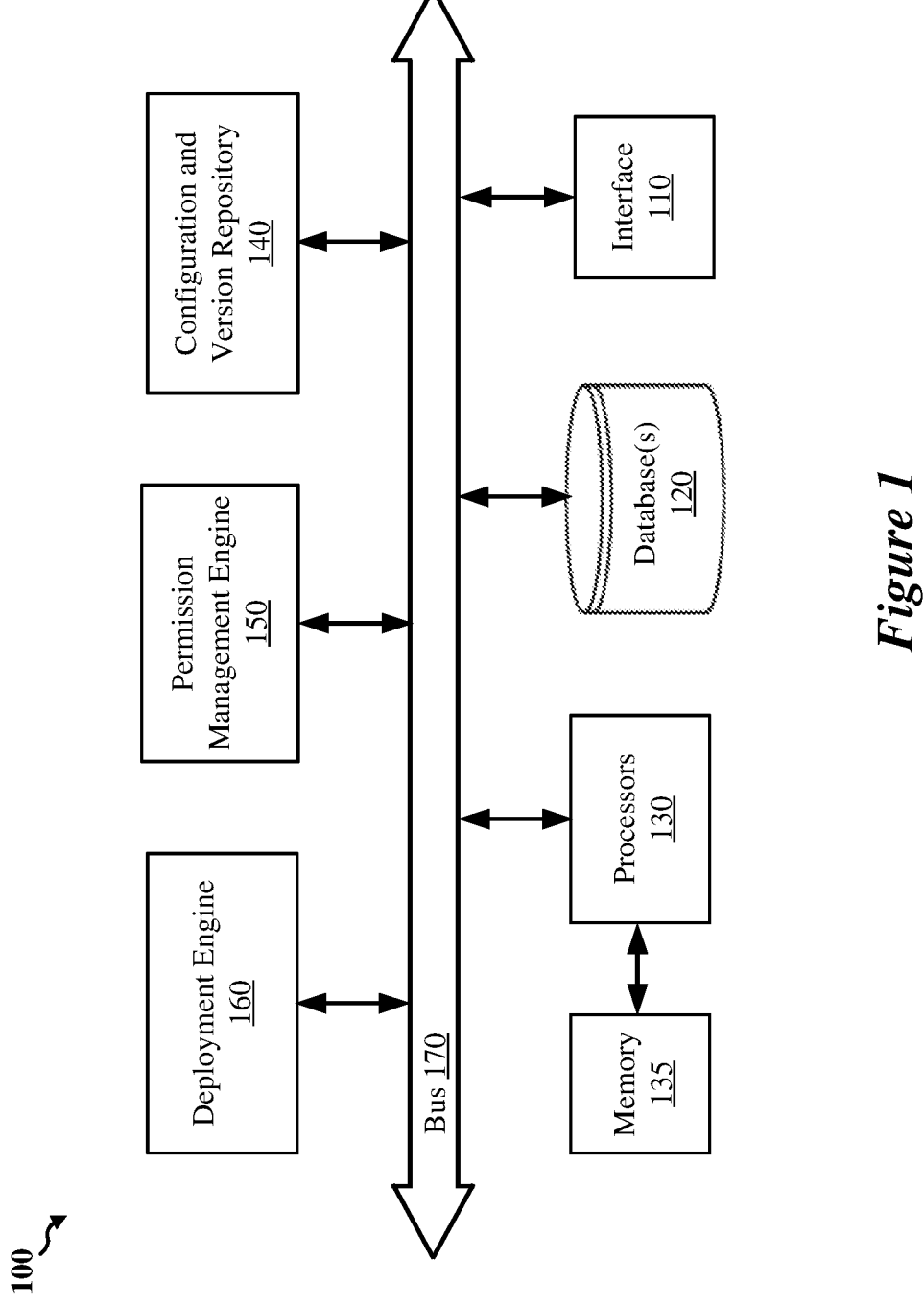
FIG. 1 shows a cloud resource deployment system, according to some implementations.

Implementations of the subject matter described in this disclosure may be used to analyze and update permissions for cloud deployments within a single workflow. More particularly, in response to a received request to deploy target cloud resources to a given state, the permissions associated with the given state may be analyzed, such as the permissions associated represented within the given state, and permissions of a cloud account associated with the given state. The permissions associated with the given state may then be updated, for example, based on a policy associated with the deployment. For example, the policy may specify that certain permissions are to be allowed, while others are to be denied. These and other aspects of the example implementations are discussed further below.

Various implementations of the subject matter disclosed herein provide one or more technical solutions to the technical problem of supporting permissions management for cloud deployments using a single workflow. Example implementations may receive a first request to deploy first target cloud resources based on a first specified state defined in a configuration repository, selectively update a first set of permissions associated with the first specified state and deploy the first target cloud resources based at least in part on the first specified state and the updated permissions. The first set of permissions may be stored in the same repository as the state files corresponding to the first specified state and updated within a common workflow with the deployment of the first target cloud resources. More specifically, various aspects of the present disclosure provide a unique computing solution to a unique computing problem that did not exist prior to the development of cloud computing resources which may be deployed based on state information stored in configuration repositories. As such, implementations of the subject matter disclosed herein are not an abstract idea such as organizing human activity or a mental process that can be performed in the human mind.

Moreover, various aspects of the present disclosure effect an improvement in the technical field of analyzing and updating permissions associated with cloud deployments within a single workflow. The integration of permissions into a single unified workflow may allow for more efficient and secure cloud operations. For example, allowing permissions to be stored as a part of the state information and to be managed within a common workflow may result in more efficient and secure cloud deployments, by ensuring that cloud resources are deployed with necessary permissions but without being overly permissive. Further, subsequent changes and additions to the cloud deployment may require additional permissions and allowing permissions to be managed within a common workflow may allow for the permissions to be more easily updated. Deploying cloud resources and managing permissions for cloud deployments cannot be performed in the human mind, much less using pen and paper. In addition, implementations of the subject matter disclosed herein are usable with a wide variety of computing applications, and do far more than merely create contractual relationships, hedge risks, mitigate settlement risks, and the like, and therefore cannot be considered a fundamental economic practice.

FIG. 1 shows a cloud resource deployment system 100, according to some implementations. Various aspects of the cloud resource deployment system 100 disclosed herein may be applicable for deploying cloud resources and managing permissions associated with those cloud resource deployments in a variety of computing applications. Such functionality may be useful for allowing users to deploy cloud computing resources and manage associated permissions in a wide variety of cloud computing applications, such as software as a service (SaaS) applications, platform as a service (PaaS) applications, infrastructure as a service (IaaS) applications, and so on.

The cloud resource deployment system 100 is shown to include an input/output (I/O) interface 110, a database 120, one or more data processors 130, a memory 135 coupled to the data processors 130, a configuration and version repository 140, a permission management engine 150, and a deployment engine 160. In some implementations, the various components of the cloud resource deployment system 100 may be interconnected by at least a data bus 170, as depicted in the example of FIG. 1. In other implementations, the various components of the cloud resource deployment system 100 may be interconnected using other suitable signal routing resources.

The interface 110 may include a screen, an input device, and other suitable elements that allow a user to provide information to the cloud resource deployment system 100 and/or to retrieve information from the cloud resource deployment system 100. Example information that can be provided to the cloud resource deployment system 100 may include configuration information for the cloud resource deployment system 100, such as information for configuring the configuration and version repository 140, permission management engine 150, or deployment engine 160, syntax and other command generation formatting information for one or more cloud providers and cloud configuration frameworks, permissions associated with one or more accounts associated with cloud providers and cloud configuration frameworks, policy information, and so on. Example information that can be retrieved from the cloud resource deployment system 100 may include change logs and other differential information between a previous state of target cloud resources and a synchronized state of the target resources, error and other audit and log information associated with deployment operations, state files and version information, such as permissions associated with the state files, to be saved in one or more external configuration or version repositories, and the like.

The database 120, which may represent any suitable number of databases, may store any suitable information pertaining to configuration of the cloud resource deployment system 100, to users of the cloud resource deployment system 100. For example, the information may include configuration information for managing permissions associated with deployment of cloud resources, configuration information associated with one or more cloud providers or cloud configuration frameworks, target information, such as account information for one or more cloud providers. In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the cloud resource deployment system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The configuration and version repository 140 may store state files associated with a cloud configuration, the state files for synchronizing target cloud resources to a specified state. The configuration and version repository 140 may also store version information associated with cloud configurations, such as a version number and a location of cloud configurations. The state files of the configuration and version repository 140 may include permissions associated with each respective cloud configuration. For example, the configuration and version repository 140 may include or be coupled to one or more repositories such as Git repositories, or other suitable repositories for storing configuration information and version information. In some aspects, all or part of the configuration and version repository 140 may not be located within the cloud resource deployment system 100 but may instead be coupled to the cloud resource deployment system 100 via one or more network resources.

The permission management engine 150 may analyze and update permissions for target cloud resources in response to received deployment requests. For example, in response to a received deployment request, the permission management engine 150 may analyze permissions associated with state information in state files of the configuration and version repository 140, and selectively update those permissions before deployment. As discussed further below, the permission management engine 150 may compare the permissions associated with a requested deployment with policy information, to determine whether those permissions are allowed or forbidden by policy. For example, when requested permissions are forbidden by policy, deployment may be halted. Further, a requested deployment may be associated with a cloud provider account, or with a cloud configuration framework account, each of which may have their own associated permissions. When the permissions associated with the requested deployment are different, then the account permissions may be updated. Finally, in some aspects the permission management engine 150 may analyze the state files associated with the requested deployment, to determine whether the permissions associated with the requested deployment are sufficient, or overbroad, and update those permissions to add required permissions, or to remove unnecessary permissions.

The deployment engine 160 may deploy cloud computing resources based on the state information in the configuration and version repository 140, and according to the permissions which may be updated by the permission management engine 150. More particularly, the deployment engine 160 may execute configuration commands in order to deploy target cloud resources based on the state files and permissions associated with received deployment requests.

The particular architecture of the cloud resource deployment system 100 shown in FIG. 1 is but one example of a variety of different architectures within which aspects of the present disclosure may be implemented. For example, in other implementations, the cloud resource deployment system 100 may not include the configuration and version repository 140, the functions of which may be implemented by the processors 130 executing corresponding instructions or scripts stored in the memory 135. In further implementations, all or part of the configuration and version repository 140 may not be located within the cloud resource deployment system 100 but may instead be coupled to the cloud resource deployment system 100 via one or more network resources. In some other implementations, the functions of the permission management engine 150 may be performed by the processors 130 executing corresponding instructions or scripts stored in the memory 135. Similarly, the functions of the deployment engine 160 may be performed by the processors 130 executing corresponding instructions or scripts stored in the memory 135.

Companies and individuals increasingly make use of cloud computing in order to deliver computing resources over networks such as the Internet. Such cloud computing deployments may use any of a variety of cloud providers, such as Amazon Web Services (AWS), Microsoft Azure, Google Cloud, Alibaba Cloud, IBM Cloud, Oracle, Salesforce, and so on. In addition, a variety of cloud configuration frameworks may be used in order to ease the creation, deployment, and management of cloud computing resources. For example, common cloud configuration frameworks may include AWS Cloud Development Kit (CDK), Terraform, OpenStack, *Eucalyptus*, the Ubuntu Cloud Infrastructure, among many others. Cloud computing deployments are typically associated with permissions, allowing or denying access to various features and functions of the applications and services of a deployment. For example, for deployments using the AWS CDK, one common service is the Simple Notification Service (SNS), a messaging service for application-to-application, or application-to-person communication. Common permissions associated with the SNS may allow or deny access to functions such as creating or deleting topics, retrieving and modifying attributes, subscribing or unsubscribing to topics, and so on. However, conventional permissions management techniques are performed by processes outside of the deployment pipeline or may require users to define and implement their own permissions management. This may be onerous for users, and may complicate management of deployments, particularly when permissions require updating. For example, a cloud deployment may not function properly without sufficient permissions enabled. These difficulties with permissions management may lead users to be overly permissive with their cloud deployments to avoid these problems. However, overly permissive deployments may cause security issues when anyone may access functions and data which are intended to be private, or otherwise restricted in access. It would therefore be desirable to simplify and unify permissions management within a common workflow with cloud deployments, allowing users to more efficiently and securely manage permissions associated with cloud deployments.

The example implementations allow for permissions associated with a cloud deployment to be managed and updated within a common workflow as the deployment itself. This may streamline permissions management, and improve permissions management, and reduce risks associated with overly permissive or insufficiently permissive deployments. Rather than requiring users to implement their own permissions management or requiring the use of separate processes and workflows in order to manage permissions, permissions may be specified and stored within a configuration repository and may be analyzed and updated within the same workflow as the cloud deployment itself.

In accordance with the example implementations, permissions for a cloud deployment may be defined within the same repository which stores the state files associated with the deployment. These permissions may be updated by the same workflow which is invoked to perform modifications to cloud resources associated with the deployment. This workflow may analyze the permissions associated with the deployment and ensure compliance with permissions policy, authorization, and compliance.

For an example deployment, changes may be committed to state files in a configuration repository. For example, such a configuration repository may be a Git repository. These changes may include changes to resources and also updates to associated permissions. These permissions may be specified in one or more files and may be grouped by application or service. For example, a given service may allow or deny permissions to access or change information associated with the service, to allow or deny various types of interaction with the service, and so on. After review, such as security scanning, and approval, a deployment workflow may be invoked, requesting deployment of the cloud resources.

Prior to implementing any changes to cloud resources, the deployment workflow may analyze the permissions associated with the deployment, updating permissions as needed, or halting the deployment workflow when permissions violate policy. Such analysis and updating of the permissions may be called "selectively updating" the permissions. The permissions associated with the requested deployment (the "deployment permissions") may be compared to one or more policies. In some aspects, these policies may specify certain permissions which are allowed, and other permissions which are not to be allowed. In some other aspects, a policy may require that a deployment not be overly permissive. For example, such a policy may require that access is not allowed to every function within a deployed service. Such a policy may be beneficial to stop users from simply enabling overly broad access to a deployment in order to guarantee the deployment's functionality, and to encourage users to consider security concerns and to specify the required permissions for the deployment. Additionally, the policies may enable an enterprise to better control permissions across all of its cloud computing deployments by standardizing allowed permissions. Further, for deployments which deal with sensitive information, such as financial information or health care information, compliance obligations may require that access to information in a cloud deployment be carefully controlled. Appropriate permissions policy may support such compliance obligations. If the deployment permissions are on compliance with the one or more policies, then the deployment may continue. Otherwise, deployment may be halted. For example, one or more error messages may be generated, specifying which of the permissions policies were violated.

In addition to evaluating the permissions against policy, account permissions may also be considered. For example, an account associated with the target cloud resources, such as an account associated with a cloud provider or cloud configuration framework, may have its own existing permissions ("account permissions"). The deployment permissions may be compared with the existing account permissions, and one or both of the deployment permissions or the account permissions may be updated. In some aspects, in order to ensure compliance with the account permissions, the deployment permissions may be updated to include any missing account permissions.

In some aspects, the state files of the requested deployment may be analyzed, and the deployment permissions may be selectively updated to ensure functionality of the requested deployment. For example, such analysis may be helpful for determining when the deployment permissions are insufficient, and do not allow access to features and functions of the deployment. For example, code scanning may be performed, for example by a suitable machine learning model, to determine which permissions may be required or desirable for the requested deployment, and the deployment permissions may be updated to include the required or desirable permissions. In some aspects, a user may be prompted to confirm or deny the permissions suggested by such code scanning. Such code scanning may also reveal deployment permissions which are unnecessary. For example, one or more functions associated with the deployment may be intended only for internal or debugging purposes, and as such access to such functions may be unnecessary on deployment. Code scanning may reveal such functions, and either automatically update one or more related deployment permissions or prompt a user to update the related deployment permissions.

After the deployment permissions have been selectively updated, the requested changes to the target cloud resources may be initiated with the updated permissions.

In some aspects, permissions management may use a management or "bootstrap" role and an execution or deployment role. This management role may be used to create and manage the deployment role, while the deployment role may be used for ordinary operation of and access to deployed cloud resources. For example, the deployment role may have only limited permissions, while the management role may have more extensive permissions, in order to implement requested changes to the deployment permissions. For example, while the deployment role may only have the permissions required to deploy and manage the cloud resources, for example to compare deployed cloud resources with a specified version of the cloud resources ("diff"), and so on, the management role may have broader permissions, for example in order to implement changes to the deployment permissions during deployment and to manage the properties and permissions of the deployment role. For security purposes, access to the management role may be removed after creating or altering these properties or permissions. Use of separate roles for these tasks may aid in security, by helping to prevent the granting of overbroad permissions to deployed cloud resources, while still allowing permissions management within the same workflow as the deployment of the cloud resources. Thus, users may tailor permissions assigned to a deployment, for example expanding or limiting permissions as needed, without requiring the use of separate permissions management tools, and without risking accidentally granting overbroad permissions to a deployment.

Figure 2:
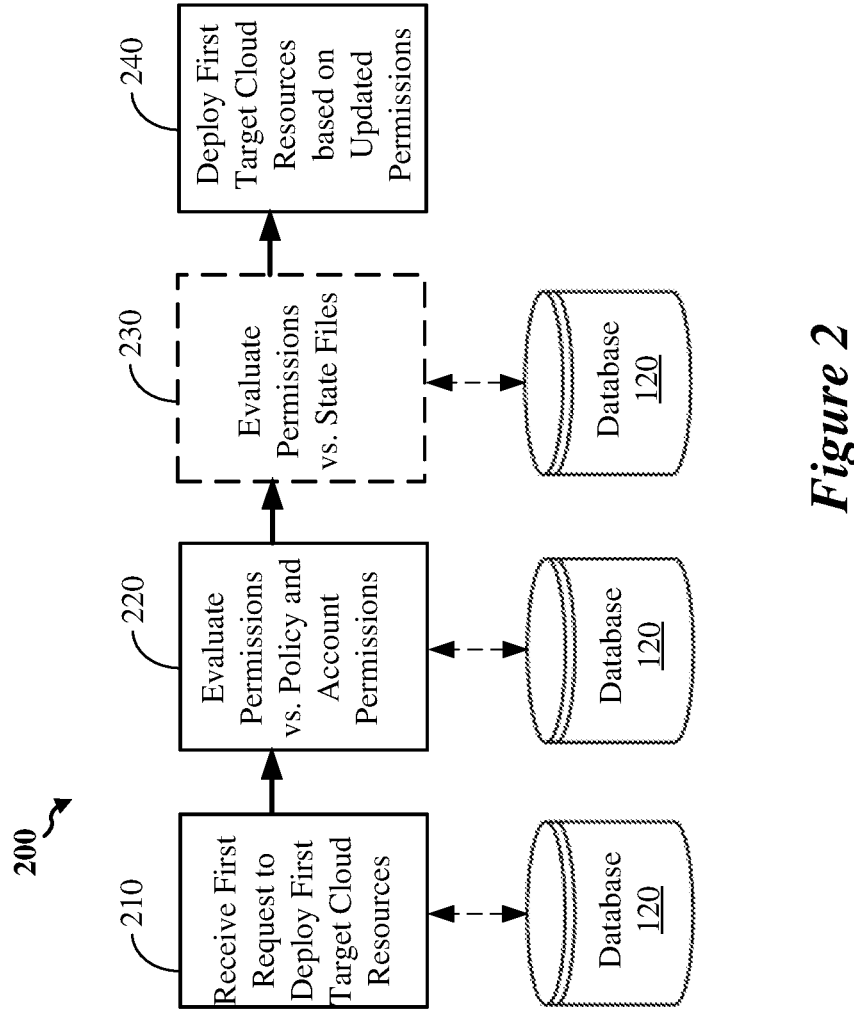
FIG. 2 shows a high-level overview of an example process flow that may be employed by the cloud resource deployment system of FIG. 1.

FIG. 2 shows a high-level overview of an example process flow 200 that may be employed by the cloud resource deployment system 100 of FIG. 1. In block 210, the cloud resource deployment system 100 receives a first request to deploy first target cloud resources, for example the first request may be received via the interface 110 or another network interface coupled to the cloud resource deployment system 100. The first request may be a request to synchronize the first target cloud resources to a first specified state defined in a configuration repository, such as the configuration and version repository 140.

In block 220, the cloud resource deployment system 100 evaluates the deployment permissions against policy and account permissions, as described above. If the deployment permissions violate one or more policies, then deployment is halted, and if the account permissions and the deployment permissions do not match, then the deployment permissions may be updated.

In block 230, the cloud resource deployment system 100 optionally evaluates the deployment permissions against the state files. For example, source code in the state files may be scanned and analyzed to determine whether the deployment permissions are insufficient for functionality of the scanned code. As described above, in some aspects a user may be prompted to add or update deployment permissions as suggested by the code scanning, and in some other aspects the deployment permissions may be automatically updated based on the code scanning.

In block 240, the cloud resource deployment system 100 deploys the first target cloud resources based on the state files associated with the first specified state and the selectively updated permissions.

Figure 3:
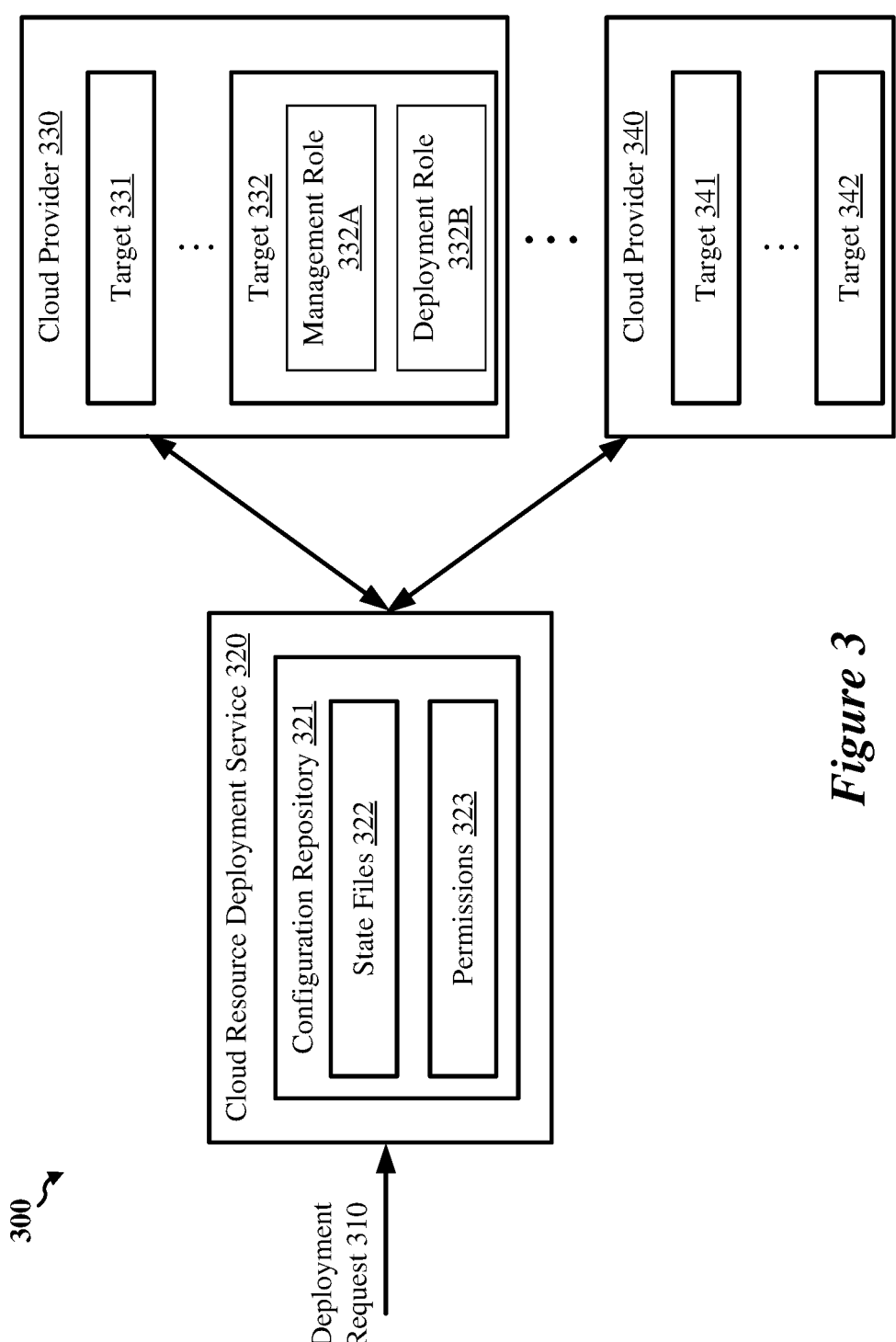
FIG. 3 shows an example cloud computing environment which may be used with the example implementations.

FIG. 3 shows an example cloud computing environment 300 which may be used with the example implementations. For example, the process flow 200 may be implemented within the cloud computing environment 300. A deployment request 310 may be received at a cloud resource deployment service 320. For example, the deployment request 310 may be one example of the first request to deploy first target cloud resources received in step 210 of the process flow 200. The cloud resource deployment service 320 may include a configuration and version repository, such as the configuration repository 321. In some examples, the cloud resource deployment service 320 may implement a Git version control system, and the configuration repository 321 may include a Git repository. The configuration repository 321 may be one example of the configuration and version repository 140, and may include a plurality of state files 322 and corresponding permissions 323 associated with the plurality of state files. In response to the reception of the deployment request 310, corresponding state files and permissions of the state files 322 and permissions 323 may be evaluated in light of permissions policy and account permissions, as shown in step 220 of the process flow 200. Optionally, the state files 322 associated with the deployment request 310 may be evaluated in light of the respective permissions of the permissions 323, as shown in step 230 of the process flow 200. After evaluation and updating of the permissions associated with the deployment request 310, the first target cloud resources may be deployed. For example, the deployment request 310 may be associated with any of a plurality of cloud providers, such as cloud providers 330 and 340 shown in FIG. 3. Further, each of the cloud providers may include a plurality of targets, where each target corresponds to cloud computing resources and to an account associated with the cloud provider. Thus, cloud provider 330 includes at least targets 331 and 332, and cloud provider 340 includes at least targets 341 and 342. Note that while FIG. 3 shows only two cloud providers, each associated with two different targets, that there may be any number of different cloud providers, each containing any number of targets. The deployment request 310 may be associated with one of the cloud providers and may identify a particular target associated with that cloud provider, such as target 331, 342, and so on.

Figure 4:
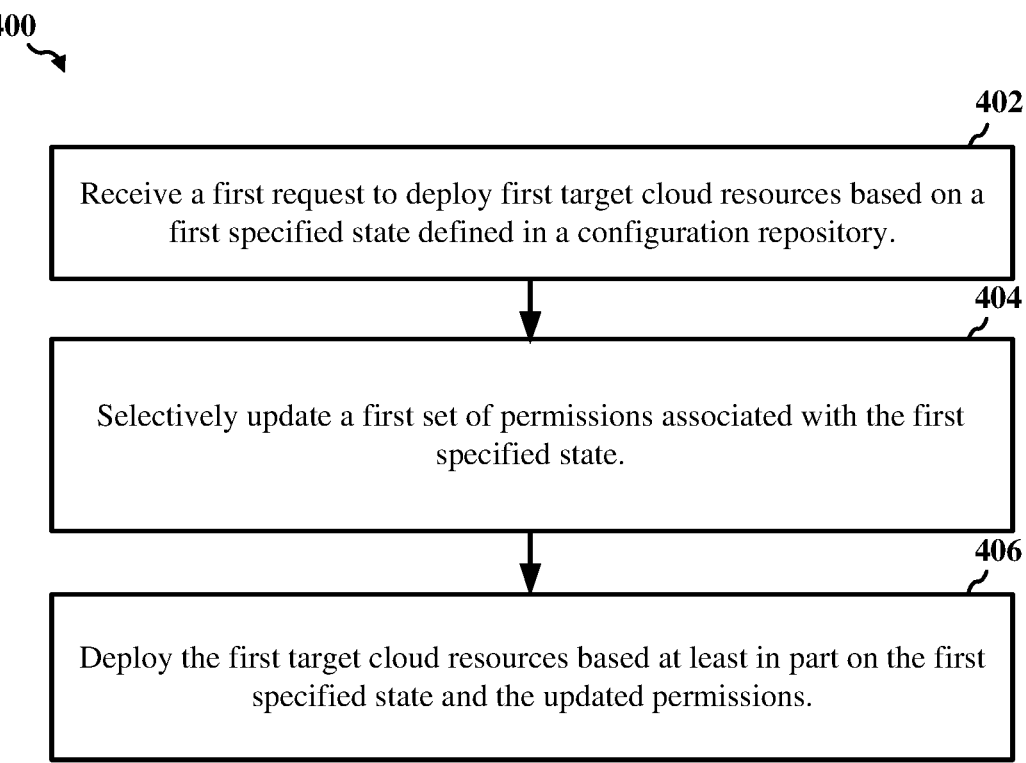
FIG. 4 shows an illustrative flow chart depicting an example operation for selectively updating permissions associated with a cloud resource deployment, according to some implementations.

FIG. 4 shows an illustrative flow chart depicting an example operation 400 for selectively updating permissions associated with a cloud resource deployment, according to some implementations. The example operation 400 may be performed by one or more processors of a computing device such as the cloud resource deployment system 100 of FIG. 1. It is to be understood that the example operation 400 may be performed by any suitable systems, computers, or servers.

At block 402, the cloud resource deployment system 100 receives a first request deploy first target cloud resources based on a first specified state defined in a configuration repository. At block 404, the cloud resource deployment system 100 selectively updates deployment permissions associated with the first specified state. At block 406, the cloud resource deployment system 100 deploys the first target cloud resources based at least in part on the first specified state and the updated deployment permissions.

In some aspects, the first target cloud resources are deployed, and the deployment permissions are selectively updated within a common workflow. In some aspects, the common workflow may be associated with a version control system, such as a Git version control system, and the configuration repository may be a Git repository. In some aspects, the common workflow may include a management context for establishing and updating permissions associated with the first target cloud resources, wherein access to the management context is removed after deploying the first target cloud resources.

In some aspects, the deployment permissions are defined within the configuration repository. In some aspects, selectively updating the deployment permissions includes comparing the deployment permissions to a set of allowed permissions. In some aspects, deployment of the first target cloud resources is halted in response to the deployment permissions including permissions not allowed by the set of allowed permissions. In some aspects, selectively updating the deployment permissions in block 404 includes removing permissions from the deployment permissions which are not allowed by the set of allowed permissions.

In some aspects, selectively updating the deployment permissions in block 404 includes comparing the deployment permissions with first existing permissions of a cloud account associated with the first target cloud resources. In some aspects, the operation 400 further includes, in response to identifying missing permissions of the first existing permissions not found within the deployment permissions, updating the deployment permissions to include the missing permissions.

In some aspects, selectively updating the deployment permissions in block 304 also includes identifying required permissions for deploying the first cloud resources based on the first specified state. In some aspects, the operation 300 further includes comparing the required permissions to the deployment permissions and updating the deployment permissions to include required permissions not found in the deployment permissions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method of selectively updating permissions associated with a cloud resource deployment, comprising:

receiving a first request to deploy first target cloud resources based on a first specified state defined in a configuration repository;

selectively updating deployment permissions associated with the first specified state, wherein the deployment permissions comprise a set of permissions defined within the configuration repository for deployment of the first target cloud resources, and wherein selectively updating the deployment permissions associated with the first specified state comprises comparing the deployment permissions to a set of allowed permissions different from the deployment permissions, and halting deployment of the first target cloud resources in response to the deployment permissions including permissions not allowed by the set of allowed permissions; and deploying the first target cloud resources based at least in part on the first specified state and the updated deployment permissions.

2. The method of claim 1, wherein the first target cloud resources are deployed, and the deployment permissions are selectively updated within a common workflow.

3. The method of claim 2, wherein the common workflow includes a management context for establishing and updating permissions associated with the first target cloud resources, wherein access to the management context is removed after deploying the first target cloud resources.

4. The method of claim 1, wherein selectively updating the deployment permissions comprises comparing the deployment permissions with existing permissions of a cloud account associated with the first target cloud resources.

5. The method of claim 4, further comprising, in response to identifying missing permissions of the existing permission not found in the deployment permissions, updating the deployment permissions to include one or more of the missing permissions.

6. The method of claim 1, wherein selectively updating the deployment permissions comprises identifying required permissions for deploying the first cloud resources based on the first specified state.

7. The method of claim 6, further comprising comparing the required permissions to the deployment permissions and updating the deployment permissions to include required permissions not found in the deployment permissions.

8. The method of claim 6, further comprising halting deployment of the first target cloud resources in response to the required permissions including permissions not found within the deployment permissions.

9. The method of claim 1, wherein the set of allowed permissions comprise allowed user account permissions associated with a first user account, wherein the first request is received from the first user account.

10. The method of claim 1, wherein the set of allowed permissions comprise enterprise-wide allowed permissions associated with a first enterprise, wherein the first request is received from a user associated with the first enterprise.

11. The method of claim 1, wherein the first target cloud resources comprise at least one or more first services, and wherein the set of allowed permissions implement a requirement that access is not allowed to every function within each service of the one or more first services.

12. A system for selectively updating permissions associated with a cloud resource deployment, comprising:

one or more processors; and a memory storing instructions that, when executed by the one or more processors, cause the system to perform operations comprising:

receiving a first request to deploy first target cloud resources based on a first specified state defined in a configuration repository;

selectively updating deployment permissions associated with the first specified state, wherein the deployment permissions comprise a set of permissions defined within the configuration repository for deployment of the first target cloud resources, and wherein selectively updating the deployment permissions associated with the first specified state comprises comparing the deployment permissions to a set of allowed permissions different from the deployment permissions, and halting deployment of the first target cloud resources in response to the deployment permissions including permissions not allowed by the set of allowed permissions; and deploying the first target cloud resources based at least in part on the first specified state and the updated deployment permissions.

13. The system of claim 12, wherein the first target cloud resources are deployed, and the deployment permissions are selectively updated within a common workflow.

14. The system of claim 13, wherein the common workflow includes a management context for establishing and updating permissions associated with the first target cloud resources, wherein access to the management context is removed after deploying the first target cloud resources.

15. The system of claim 12, wherein execution of the instructions for selectively updating the deployment permissions causes the system to perform operations comprising comparing the deployment permissions with existing permissions of a cloud account associated with the first target cloud resources and, in response to identifying missing permissions of the existing permissions not found within the deployment permissions, updating the deployment permissions to include one or more of the missing permissions.

16. The system of claim 15, wherein the set of allowed permissions comprise allowed user account permissions associated with a first user account, wherein the first request is received from the first user account.

17. The system of claim 15, wherein the set of allowed permissions comprise enterprise-wide allowed permissions associated with a first enterprise, wherein the first request is received from a user associated with the first enterprise.

18. The system of claim 15, wherein the first target cloud resources comprise at least one or more first services, and wherein the set of allowed permissions implement a requirement that access is not allowed to every function within each service of the one or more first services.

* * * * *